US006833927B2

United States Patent
Gusmano et al.

(10) Patent No.: US 6,833,927 B2
(45) Date of Patent: Dec. 21, 2004

(54) METHOD AND APPARATUS FOR AUTOMATICALLY DETECTING A PAPER USER INTERFACE

(75) Inventors: Donald J. Gusmano, Henrietta, NY (US); Robert J. Dash, Victor, NY (US)

(73) Assignee: Xerox Corporation, Stamford, CT (US)

( * ) Notice: Subject to any disclaimer, the term of this patent is extended or adjusted under 35 U.S.C. 154(b) by 263 days.

(21) Appl. No.: 09/767,968

(22) Filed: Jan. 23, 2001

(65) Prior Publication Data

US 2002/0097426 A1 Jul. 25, 2002

(51) Int. Cl.⁷ .............................. G06K 15/00; B41J 5/00
(52) U.S. Cl. ................. 358/1.15; 400/103; 235/426.24; 428/192
(58) Field of Search ................................. 358/474, 312, 358/321, 505, 512, 513, 406, 482, 484, 1.15; 428/192; 400/103; 235/462.24

(56) References Cited

U.S. PATENT DOCUMENTS

| | | | | |
|---|---|---|---|---|
| 4,106,060 A | * | 8/1978 | Chapman | 358/256 |
| 4,207,598 A | * | 6/1980 | Reich | 358/257 |
| 4,748,317 A | * | 5/1988 | Satoh | 235/462 |
| 4,811,111 A | * | 3/1989 | Kurokawa | 358/257 |
| 4,893,333 A | * | 1/1990 | Baran | 379/100 |
| 5,659,164 A | * | 8/1997 | Schmid et al. | 235/375 |
| 6,026,365 A | | 2/2000 | Hayashi | 705/9 |
| 6,144,997 A | | 11/2000 | Lamming et al. | 709/217 |
| 6,208,436 B1 | * | 3/2001 | Cunningham | 358/474 |
| 6,426,806 B2 | * | 7/2002 | Melen | 358/468 |

* cited by examiner

Primary Examiner—Jerome Grant, II
(74) Attorney, Agent, or Firm—Perman & Green, LLP

(57) ABSTRACT

A system and method for facilitating the distribution of a digital data file representing an original document by providing a coded cover sheet containing distribution processing instructions in the form of a paper UI. The code indicating the presence of the paper UI. The system includes an optical sensor which detects the code and signals a control processor to process the paper UI instructions.

12 Claims, 4 Drawing Sheets

FIG. 3

FlowPort™ Cover Sheet
Put this Cover Sheet in front of your document

DigiPath Cover Sheet

Printer

☐ DocuTech 6135
☐ DocuTech 6180

| Quantity | Sides Printed | Finishing |
|---|---|---|
| 0 ☐☐☐☐ | ☐ 1 Sided | ☐ None |
| 1 ☐☐☐☐ | ☐ 2 Sided, flip on long edge | ☐ 1 Staple |
| 2 ☐☐☐☐ | ☐ 2 Sided, flip on short edge | ☐ 2 Staple |
| 3 ☐☐☐☐ | | ☐ Stitching |
| 4 ☐☐☐☐ | NUP | |
| 5 ☐☐☐☐ | ☐ 1 Up   ☐ 8 Up | |
| 6 ☐☐☐☐ | ☐ 2 Up   ☐ 16 Up | |
| 7 ☐☐☐☐ | ☐ 4 Up   ☐ 32 Up | |
| 8 ☐☐☐☐ | | |
| 9 ☐☐☐☐ | | |

Page Numbering

Location:
☐ Top Left   ☐ Top Center   ☐ Top Right
☐ Bottom Left ☐ Bottom Right ☐ Bottom Center

Covers

☐ None
Cover Type
☐ White   ☐ Blue   ☐ Yellow   ☐ Red   ☐ Green   ☐ Pink
☐ Cover   ☐ Bond   ☐ Index

Image Shift

☐ None

| | | | | | |
|---|---|---|---|---|---|
| Right | ☐ 0.10" | ☐ 0.20 | ☐ 0.25" | ☐ 0.50 | ☐ 0.75" |
| Left | ☐ 0.10" | ☐ 0.20 | ☐ 0.25" | ☐ 0.50 | ☐ 0.75" |
| Top | ☐ 0.10" | ☐ 0.20 | ☐ 0.25" | ☐ 0.50 | ☐ 0.75" |
| Bottom | ☐ 0.10" | ☐ 0.20 | ☐ 0.25" | ☐ 0.50 | ☐ 0.75" |

Edge Delete

☐ None

| | | | | | |
|---|---|---|---|---|---|
| All | ☐ 0.10" | ☐ 0.20 | ☐ 0.25" | ☐ 0.50 | ☐ 0.75" |
| Right | ☐ 0.10" | ☐ 0.20 | ☐ 0.25" | ☐ 0.50 | ☐ 0.75" |
| Left | ☐ 0.10" | ☐ 0.20 | ☐ 0.25" | ☐ 0.50 | ☐ 0.75" |
| Top | ☐ 0.10" | ☐ 0.20 | ☐ 0.25" | ☐ 0.50 | ☐ 0.75" |
| Bottom | ☐ 0.10" | ☐ 0.20 | ☐ 0.25" | ☐ 0.50 | ☐ 0.75" |

FIG. 4

METHOD AND APPARATUS FOR AUTOMATICALLY DETECTING A PAPER USER INTERFACE

BACKGROUND OF THE INVENTION

The invention relates generally to facilitating the distribution of documents generated in digital form by multi-function devices which provides scanning, printing, and facsimile capability. Through the use of document distribution software, the digital information generated by these devices can be sent to multiple applications, repositories and media.

The FlowPort™ software available from Xerox is an example of document distribution software designed to merge paper documents into E-mail, workflow, and document management systems. It performs the functions of distributing, retrieving and storing digital documents generated by scanning paper documents.

This type of software is set up to scan commands from a paper user interface which is generated by the user. The user simply fills out a form and directs, by an appropriate, menu driven user interface, the multifunction process controller to recognize the paper instructions. This requires that the image processor examine the image to determine if it is a paper user interface (paper UI) and, if it is, direct the image to a scan to file pathway where it is stored in an appropriate buffer. This requires a mid-stream processing change.

It is a purpose of this invention to provide a method of detecting the paper UI prior to the scanning and image processing steps and automatically provide the control processor with instructions. This eliminates the need to provide this functionality on the user interface. It will also reduce the need to interrupt the image processing and eliminate the scan buffer.

SUMMARY OF THE INVENTION

This invention is designed to simplify certain functions of a multi-function or similar printing machine. The machine in which the invention is used generates a digital image of an original document for printing, faxing, or copying. The document is scanned to create the digital image which is processed according to the desired function. The system of the machine includes a document distribution processor which is controlled by document distribution software. This software analyzes information on a document which contains instructions for the handling of the digital information relating to a particular job. The document is called a paper UI and is simply a paper form which is prepared by the user. The paper UI of this invention is constructed having marking in the nature of bar coding or other similar optically readable code. The bar code may be constructed as a series of lines along the border of the paper UI to accommodate the general range of document feeders. An optical sensor is placed in the path of the document feed to read the coded border of the paper UI and provide a signal to the control processor of the multifunction machine. The control processor would direct the digital information to a document distribution processor. Document distribution software would cause the distribution processor to analyze the information on the paper UI and to handle the digital document in accordance with such information. When the bar code is sensed, the cover page is treated by the processor as a paper UI and the machine will change mode to accommodate this function prior to scanning the document.

DESCRIPTION OF THE DRAWING

The invention is described in more detail below with reference to the attached drawing in which:

FIG. 3 is an example of a bar coded paper UI according to this invention, and

DETAILED DESCRIPTION OF THE INVENTION

Figure 1:
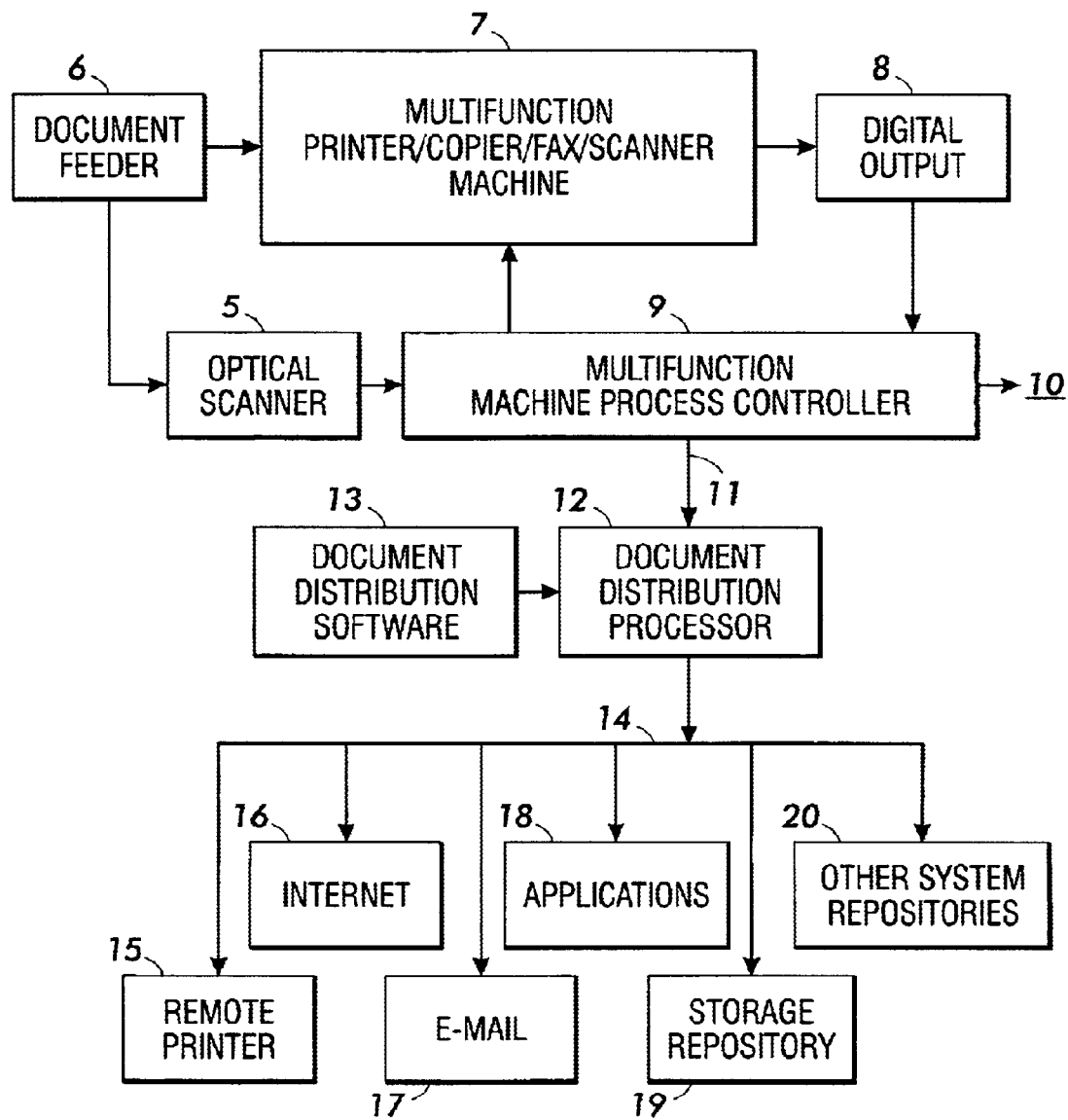
FIG. 1 is a block diagram of the system for implementing the invention.

A multi-function device 1 is shown in FIG. 1 and is constructed to allow the user to process a document or other material by scanning, printing, copying and/or faxing. Although, the input to the multi-function device may be provided by a variety of devices connected through a network server (not shown), this invention is primarily concerned with digital data generating from an original paper document. Once the document is converted to digital form a considerable number of destination opportunities arise. To assist in servicing these opportunities, document distribution software is available, such as the FLOW-PORT™ software available from Xerox Corporation. Document distribution software drives a processor to distribute the digital image to e-mail servers, remote printers, document repositories, applications and other destinations.

Figure 4:
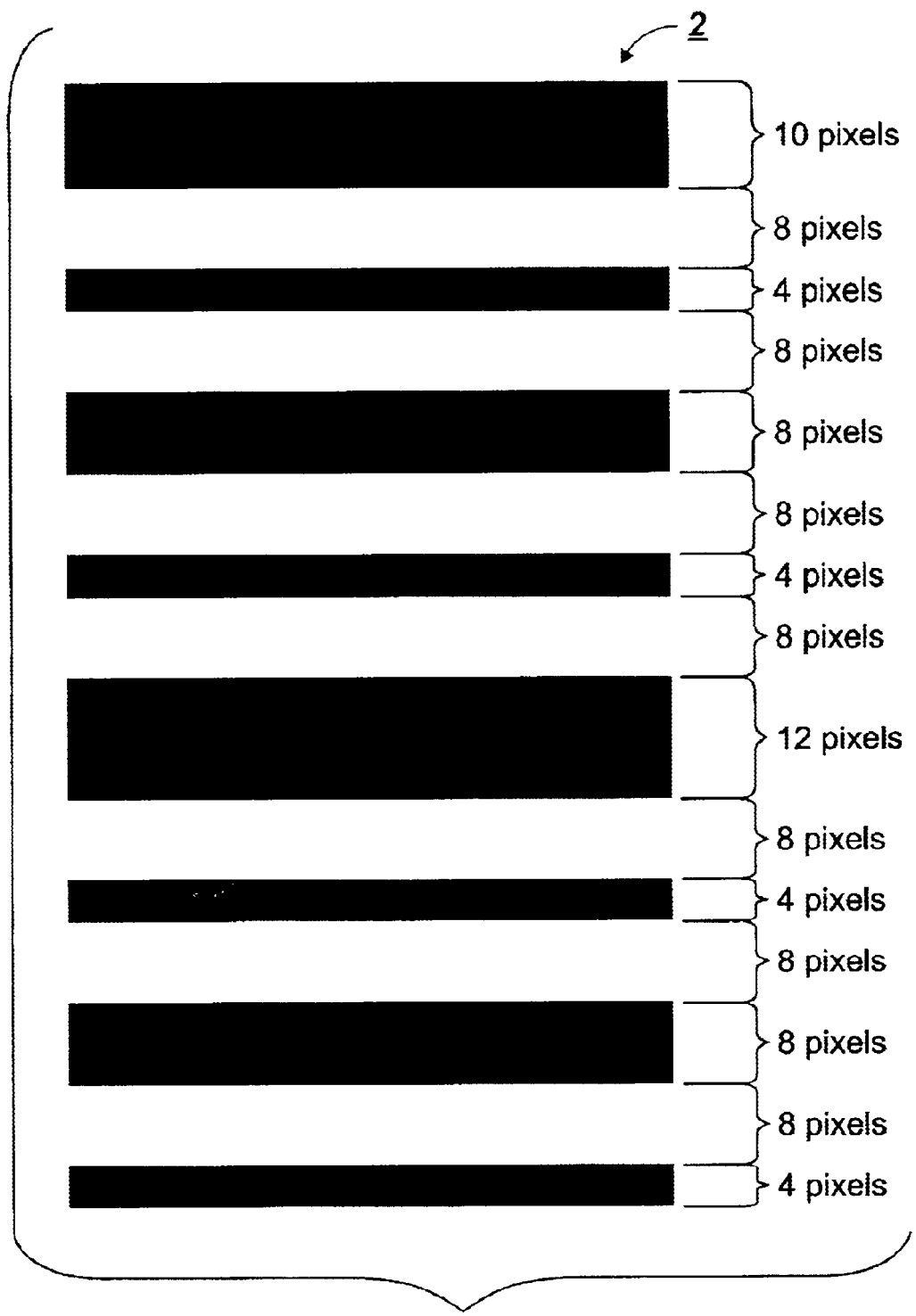
FIG. 4 is an example of a bar code for use in accordance with this invention.

One of the features of this type of software is its ability to analyze image data for instructions regarding the handling of the document data. The instructions are inputted by means of a paper form referred to as a paper user interface (UI). A paper UI 1, designed according to this invention, is shown in FIG. 3. It is coded with a bar code 2 or other code which is optically readable. As shown in FIG. 3, the bar code is printed as a border extending around the margins of the document 3. An optical reader or sensor 5, is positioned in the path of the document 3, for example adjacent to the paper tray or document feeder 6. Placing the code at the margins of the paper UI 1, along at least two adjoining edges, as shown in FIG. 4, insures the sensor 5 will be exposed to the bar code no matter what the nature of the document feed. In this manner the optical reader 5 can accommodate long edge feeding, short edge feeding, center registered document feeders, and edge registered document feeders.

The bar code 2 may consist of a series of lines or markings 4 having a predetermined length and width as shown in FIG. 4. The optical reader would look for a recognized pattern and trigger the document distribution pathway.

As shown in FIG. 1, a multifunction machine 7 which includes a scanner or other means of converting a document to a digital format. Document feeder 6 receives an original document for processing in the machine 7. An optical scanner 5 is positioned in the path of the document 3 to detect a paper UI 1 by recognizing bar code 2, thereby indicating to the system that cover sheet 3 contains handling instructions. The output 8 of machine 7 is processed by controller 9, according to the desired function. Controller 9 is constructed with a multiple function processing pathway 10 and a document distribution pathway 11. When a paper UI 1 is detected, the digital output 8 is sent to document distribution processor 12 which is controlled by a software module 13. Processor 12 directs the data 8 in accordance with the instructions contained on paper UI 1. The distribution is accomplished by an appropriate communication medium, such as network 14. Network 14 may serve a variety of destinations such as remote printer 15, Internet server 16, an e-mail address 17, assorted applications 18, storage repository 19, and many other functions represented generally at 20.

Figure 2:
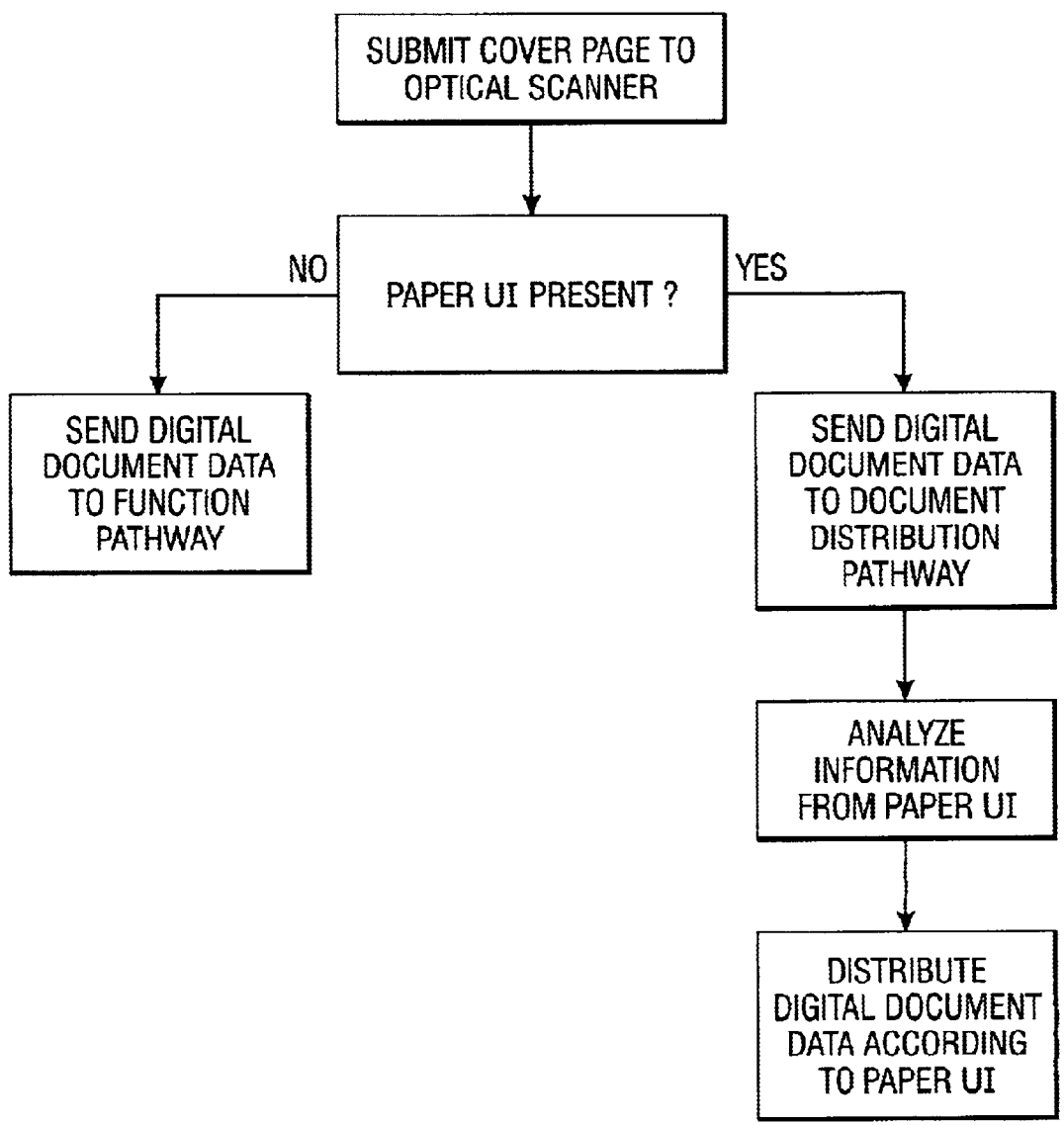
FIG. 2 is a block diagram showing the steps of the method of this invention.

FIG. 2 illustrates the operation of the method of this invention. The cover page 3 of a document is analyzed by an optical scanner 5 to determine if it is a paper UI. In accordance with this invention, the paper UI is distinguished by marking its margins with a bar code. If optical scanner 5 detects a bar code, the cover sheet is a paper UI. Controller 9 is then instructed to direct the output data 8 from multi-function machine 7 to the document distribution pathway 11. Document distribution processor 12 directs the digital data file of the document according to the instructions of the paper UI. The instructions are analyzed and processed in accordance with document distribution software. In this manner the initial operational pathway is determined prior to scanning the document.

In alternate embodiments of this invention, additional information may be represented by the bar code for example, the type of document, for example supplies reorder forms, registration forms, etc. An application specific pathway would then be indicated, for example, to facilitate reordering of supplies or other common, repetitive tasks.

We claim:

1. A system for distributing a digital data file from an original document, said data file being generated by scanning said document in a multifunction machine, said system comprising:

a controller designed to control the functioning of the multifunction machine, to process the digital data file therefrom and direct said file to a document data file distribution pathway and/or other functional pathways;

a cover page, having margins along the edges thereof, comprising a paper UI having information contained thereon relating to the desired distribution of said document data file, said paper UI including an optically detectable code, said code indicating that the cover page is a paper UI, wherein said optically detectable code is positioned as a border in said margins of at least two adjoining edges of the paper UI; and an optical sensor positioned to read said cover page and detect the presence of a paper UI, said optical sensor signaling said controller, prior to the generation of said document data file, when said paper UI is present to enable said controller to select the document data file distribution pathway.

2. A system for distributing a digital data file from an original document, said data file being generated by scanning said document in a multifunction machine, as described in claim 1, wherein said document data file distribution pathway is constructed having a processor controlled by a data distribution module.

3. A system for distributing a digital data file from an original document, said data file being generated by scanning said document in a multifunction machine, as described in claim 1, wherein said optically detectable code comprises a bar code having a predetermined pattern indicating the presence of a paper 131.

4. A system for distributing a digital data file from an original document, said data file being generated by scanning said document in a multifunction machine, as described in claim 3, wherein said optically detectable code comprises a bar code having a predetermined pattern further indicating the type of document being processed.

5. Apparatus for detecting processing information on the cover page of a document in a multifunction machine having a scanner to convert the document into a digital data file, said multifunction machine including a controller designed to control said multifunction machine and to direct said digital data file to a document data file distribution pathway; said apparatus comprising:

a cover page, having margins along the edges thereof, for said document comprising a paper UI having information contained thereon relating to the desired distribution of said document data file, said paper UI including an optically detectable code, said code indicating that the cover page is a paper UI, wherein said optically detectable code is positioned as a border in said margins of at least two adjoining edges of the paper UI; and an optical sensor positioned to read said cover page and detect the presence of a paper UI, said optical sensor signaling said controller, prior to the operation of said scanner of said multifunction machine, when said paper UI is present to enable said controller to select the document data file distribution pathway.

6. Apparatus for detecting processing information on the cover page of a document in a multifunction machine having a scanner to convert the document into a digital data file, said multifunction machine including a controller designed to control said multifunction machine and to direct said digital data file to a document data file distribution pathway; said apparatus, as described in claim 5, wherein said document data file distribution pathway is constructed having a processor controlled by a data distribution module.

7. Apparatus for detecting processing information on the cover page of a document in a multifunction machine having a scanner to convert the document into a digital data file, said multifunction machine including a controller designed to control said multifunction machine and to direct said digital data file to a document data file distribution pathway; said apparatus, as described in claim 5, wherein said optically detectable code comprises a bar code having a predetermined pattern indicating the presence of a paper UI.

8. Apparatus for detecting processing information on the cover page of a document in a multifunction machine having a scanner to convert the document into a digital data file, said multifunction machine including a controller designed to control said multifunction machine and to direct said digital data file to a document data file distribution pathway; said apparatus, as described in claim 7, wherein said optically detectable code comprises a bar code having a predetermined pattern further indicating the type of document being processed.

9. A method for distributing a digital data file from an original document generated by a multifunction machine, said machine having a controller for processing said digital data file, comprising the steps of:

converting information on the original document to a digital data file;

processing said digital data file and selecting a pathway for further processing of said digital data file, said selectable pathways including a document data file distribution pathway;

constructing a cover page, having margins along the edges thereof, for said document comprising a paper UI having information contained thereon relating to the desired distribution of said document data file, said paper UI including an optically detectable code, said code indicating that the cover page is a paper UI, wherein said optically detectable code is positioned as a border in said margins of at least two adjoining edges of the paper UI;

using an optical sensor positioned to read said cover page and detect the presence of a paper UI;

signaling said controller, prior to the generation of said digital data file, when said paper UI is present to enable said controller to select the document data file distribution pathway.

10. A method for distributing a digital data file from an original document generated by a multifunction machine, said machine having a controller for processing said digital data file, said method, as described in claim 9, wherein said document data file distribution pathway is constructed having a processor controlled by a data distribution module.

11. A method for distributing a digital data file from an original document generated by a multifunction machine, said machine having a controller for processing said digital data file, said method, as described in claim 9, wherein said optically detectable code comprises a bar code having a predetermined pattern indicating the presence of a paper UI.

12. A method for distributing a digital data file from an original document generated by a multifunction machine, said machine having a controller for processing said digital data file, said method, as described in claim 11, wherein said optically detectable code comprises a bar code having a predetermined pattern further indicating the type of document being processed.

\* \* \* \* \*